(12) United States Patent
Tokoyoda et al.

(10) Patent No.: US 7,042,642 B2
(45) Date of Patent: May 9, 2006

(54) DIFFRACTIVE OPTICAL ELEMENT

(75) Inventors: Yoshifumi Tokoyoda, Chiba-ken (JP); Kenzaburo Suzuki, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 30 days.

(21) Appl. No.: 10/673,229

(22) Filed: Sep. 30, 2003

(65) Prior Publication Data
US 2005/0018299 A1  Jan. 27, 2005

(30) Foreign Application Priority Data
Oct. 4, 2002  (JP) .............................. 2002-292970

(51) Int. Cl.
*G02B 5/18* (2006.01)
(52) U.S. Cl. ..................... 359/576; 359/569; 359/571; 359/566
(58) Field of Classification Search ................ 359/566, 359/569, 571, 576
See application file for complete search history.

(56) References Cited

U.S. PATENT DOCUMENTS

2003/0112515 A1 * 6/2003 Nakabayashi ............... 359/571

FOREIGN PATENT DOCUMENTS

JP        2002-48906        2/2002

* cited by examiner

Primary Examiner—Fayez G. Assaf
(74) Attorney, Agent, or Firm—Miles & Stockbridge PC

(57) ABSTRACT

A diffractive optical element includes a first diffractive element and a second diffractive element that is made of a material different from that of the first diffractive element and is cemented with the first diffractive element, forming a diffraction grating at the cemented surface. A shade film is formed on a wall surface of each groove of the diffraction grating to enhance the angular characteristic of the grating.

16 Claims, 4 Drawing Sheets

US 7,042,642 B2

DIFFRACTIVE OPTICAL ELEMENT

INCORPORATION BY REFERENCE

The disclosure of the following priority application is herein incorporated by reference:
Japanese Patent Application No. 2002-292970 filed Oct. 4, 2002.

BACKGROUND OF THE INVENTION

1. Field of the Invention

The present invention relates to a diffractive optical element for producing diffracted light flux relative to an incident light, and more particularly to a diffractive optical element capable of being used in wideband wavelength.

2. Description of Related Art

A diffractive optical element is an optical element having a lattice structure of slits or grooves spaced at even intervals with several hundred lines per a small distance (about 1 mm), and it has the characteristic that when a light is incident to it, it produces diffracted light fluxes in directions determined by the wavelength of the light and the separation (pitch) of slits or grooves. Diffractive optical elements like this are used in various kinds of optical systems. For example, an optical element used as a lens for converging a specific order of diffracted light into a point has been known.

Among known diffractive optical elements, a so-called multi-layer diffractive optical element has been proposed. The diffractive optical element of this type has structure laminating a plurality of diffractive elements having a sawtooth shape surface in a form appressed with each other. It has a characteristic of high diffractive efficiency over almost the entirety of a required wide wavelength range (for example, whole visible light range from g-line (435.8 nm) to C-line (656.3 nm)) or, in other words, good spectral characteristic.

Generally, a multi-layer type diffractive optical element has one of a laminated multi-layer structure constructed by a glass material 60 cemented with a resin material 70 at the same diffraction grating 100 as shown in FIG. 3A, or a separated multi-layer structure constructed by a first diffractive optical element 160 having a first diffraction grating 110 and a second diffractive element 170 having a second diffraction grating 120, in which respective diffraction gratings 110 and 120 are closely located and facing with each other, for example, respective gratings facing each other separated by an air space 130 as shown in FIG. 3B. Here, in the case of a separated multi-layer type diffractive optical element, in order to satisfy the condition for correcting chromatic aberration at two predetermined wavelengths, the groove height d110 of the first diffraction grating 110 of the first diffractive element 160 is set to a predetermined value and the groove height d120 of the second diffraction grating 120 of the second diffractive element 170 is set to another predetermined value. Accordingly, diffraction efficiencies for the predetermined two wavelengths become 1.0 and high diffractive efficiency can also be obtained at the other wavelengths. In a transparent type diffractive optical element according to the present specification, diffractive efficiency is defined as a ratio $\eta$ ($=(I_1/I_0) \times 100\%$) of intensity of a first order diffracted light $I_1$ to that of an incident light $I_0$.

In the multi-layer type diffractive optical element with the above-described construction, although diffraction efficiency can be made high within wide wavelength range, it has a problem that a rate of decrease in diffractive efficiency relative to variation in the incident angle of the incident light (hereinafter called angular characteristic) becomes worse in comparison with a single-layer type diffractive optical element as shown in FIG. 4B. In a single-layer type diffractive optical element, the incident angle at which diffraction efficiency becomes lower than 90% when the pitch of the diffraction grating grooves is about 0.1 mm is about 30 degrees. On the other hand, in a multi-layer type diffractive optical element, the incident angle at which diffraction efficiency becomes lower than 90% when the pitch of the diffraction grating grooves is about 0.1 mm is about 10 degrees.

The reason why angular characteristic of a multi-layer type diffractive optical element is worse than that of a single-layer type diffractive optical element is the difference in the wall height of each diffraction grating groove. The wall height d20 of the diffraction grating groove 20 of the single-layer type diffractive optical element shown in FIG. 4B is about 1 μm. On the other hand, the wall height of the multi-layer type diffractive optical element becomes more than 10 μm. In particular, the wall height d10 of the diffraction grating groove 10 of the multi-layer type diffractive optical element shown in FIG. 4A becomes more than 20 μm.

Due to the difference in wall height, respective areas r and r' where incident light proceeds in the diffraction grating with a given optical path among all incident light having an incident angle of α shown in FIG. 4 differ with each other. The area r corresponding to the multi-layer type diffractive optical element shown in FIG. 4A is narrower than the area r' corresponding to the single-layer layer type diffractive optical element shown in FIG. 4B. So the angular characteristic becomes worse in the multi-layer type diffractive optical element.

Among all incident light, the light rays passing through the wall of the diffractive optical element (for example, the wall 30 of the multi-layer type diffractive optical element shown in FIG. 4A) become unnecessary light (hereinafter called flare), which does not follow the designated optical path to reach a designated position. As the angle of incidence increases, the amount of flare increases, so the optical performance of the diffractive optical element becomes worse. The produced flare becomes an ordinary reflected light including a total reflection light (case A) or scattered light (case B) in accordance with the state of the wall surface 30. The area fL producing the flare becomes narrow as fL' when the wall height of the diffraction grating groove is low as shown in FIG. 4B, such that flare is scarcely produced.

In a method for reducing the flare of the diffractive optical element described above, there is a construction having a shade for blocking a light incident to (or leaving from) the wall of the diffraction grating groove locating on the incident (or exit) plane of the diffractive optical element. This is disclosed on page 3 in FIG. 1 in Japanese Laid-Open Patent Application No. 2002-48906.

However, when a construction forming a shade on the incident (or exit) plane of the diffractive optical element is applied, the shade must be formed on the position of the incident (or exit) plane exactly correspondent to the wall of the diffraction grating groove, so it is difficult for the diffractive optical element to be manufactured.

SUMMARY OF THE INVENTION

The present invention is made in view of the aforementioned problems and has an object to provide a multi-layer type diffractive optical element capable of reducing the production of flare.

According to an aspect of the present invention, a diffractive optical element includes a first diffractive element, a second diffractive element that is made of a material different from the first diffractive element and is cemented with the first diffractive element, and a diffraction grating formed on the cemented surface. A shade is formed on a wall surface in each groove of the diffraction grating.

In one preferred embodiment of the present invention, it is preferable that the material of one of these two diffractive elements is glass for glass molding, and that of the other diffractive element is resin.

In one preferred embodiment of the present invention, one of these two diffractive elements preferably satisfies the following two conditional equations:

$$1.55 \leq ndG \leq 1.70$$

$$50 \leq \upsilon dG \leq 65$$

where ndG denotes refractive index of one of these two diffractive elements at d-line, and υdG denotes Abbe number of one of these two diffractive elements at d-line. The other of these two diffractive elements preferably satisfies the following two conditional equations:

$$1.50 \leq ndR \leq 1.65$$

$$\upsilon dR \leq 45$$

where ndR denotes refractive index of the other of these two diffractive elements at d-line, and υdR denotes Abbe number of the other of these two diffractive elements at d-line.

In one preferred embodiment of the present invention, it is preferable that the minimum pitch of the diffraction grating grooves is 50 μm or more.

In one preferred embodiment of the present invention, it is preferable that the wall height of the diffraction grating groove is 20 μm or less.

According to another aspect of the present invention, a diffractive optical element includes a first diffractive element on which a first diffraction grating is formed, and a second diffractive element made of material different from that of the first diffractive element on which a second diffraction grating having a different wall height from that of the first diffraction grating is formed. The surface on which the first diffraction grating is formed and the surface on which the second diffraction grating is formed are facing each other with a given space. A shade is formed on a wall surface in each groove of the first diffraction grating, and a shade is formed on a wall surface in each groove of the second diffraction grating.

In one preferred embodiment of the present invention, it is preferable that both the first diffractive element and the second diffractive element are made of resin.

In one preferred embodiment of the present invention, it is preferable that the minimum pitch of the first diffraction grating grooves and the second diffraction grating grooves is 50 μm or more.

Other features and advantages of the present invention will be readily understood from the detailed description of the preferred embodiments in conjunction with the accompanying drawings.

DESCRIPTION OF THE PREFERRED EMBODIMENTS

Figure 1A:
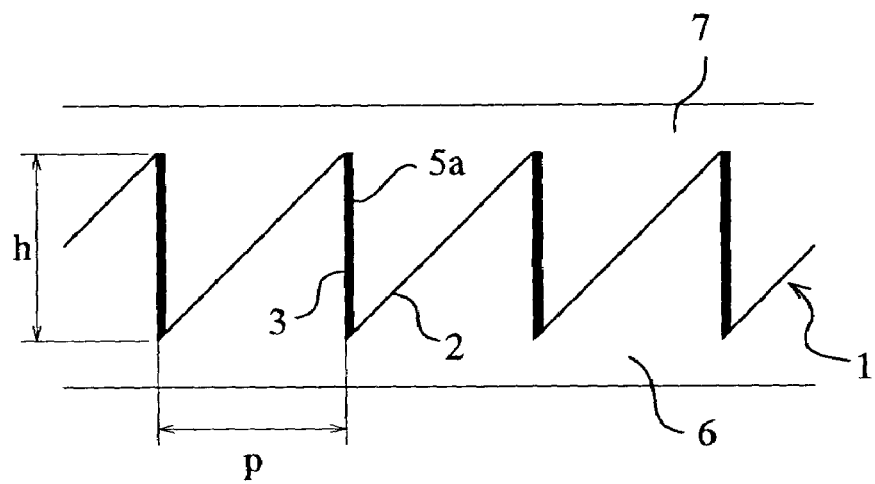
FIG. 1A is a sectional view showing a laminated multi-layer type diffractive optical element according to the present invention.

At first, a preferred embodiment of the present invention is explained with reference to the accompanying drawings. The present invention improves optical performance of a diffractive optical element by reducing flare produced by a light incident to a wall surface of the diffraction grating groove. A shade (such as a shade film) is formed on the wall surface of the diffraction grating groove so as to reduce flare caused by light passing other than on a designated optical path. The shade is explained with reference to FIG. 1. FIG. 1A is a sectional view showing a laminated multi-layer type diffractive optical element. A first diffractive element 6 and a second diffractive element 7, each made of a different material, are cemented with each other. On the respective cemented surfaces of the first and second diffractive elements 6 and 7, diffraction gratings having the identical shape are formed, and one of these diffractive elements 6 or 7 fits into and is cemented with the other in complementary fashion. Accordingly, a diffraction grating 1 is formed on the cemented portion. The sectional view of the diffraction grating 1 has a saw-toothed shape and is composed of a slope portion 2 and a wall surface 3. In order to prevent flare from being produced on the wall surface 3 of the diffraction grating 1, a shade film 5a is formed on the wall surface 3. Accordingly, an increase in production of flare with increasing angle of incidence can be suppressed.

Figure 1B:
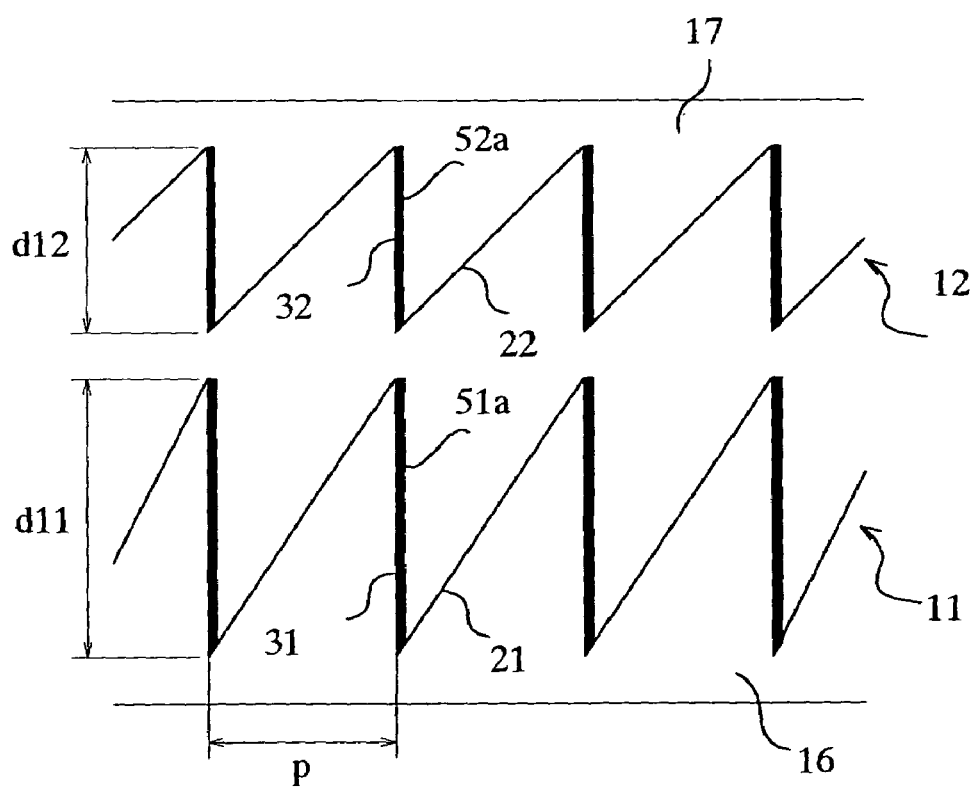
FIG. 1B is a sectional view showing a separated multi-layer type diffractive optical element according to the present invention.

FIG. 1B is a sectional view showing a separated multi-layer type diffractive optical element. This is constructed by a first diffractive element 16 and a second diffractive element 17, each made of a different material. The first diffractive element 16 has a first diffraction grating 11 composed of a slope portion 21 and a wall surface 31 which has a wall height of d11. The second diffractive element 17 has a second diffraction grating 12 composed of a slope portion 22 and a wall surface 32 which has wall height d12 different from that of the first diffraction grating 11. These diffraction gratings 11 and 12 are closely located facing with each other. In order to suppress flare production at the wall surfaces, shade films 51a and 52a are formed on the wall surfaces 31 and 32, respectively, so the increase in production of flare with increasing angle of incidence can be suppressed. Although each of the above-described diffraction gratings 1, 11, and 12 has a saw-toothed shape, the present invention is not limited to this shape.

Figure 2A:
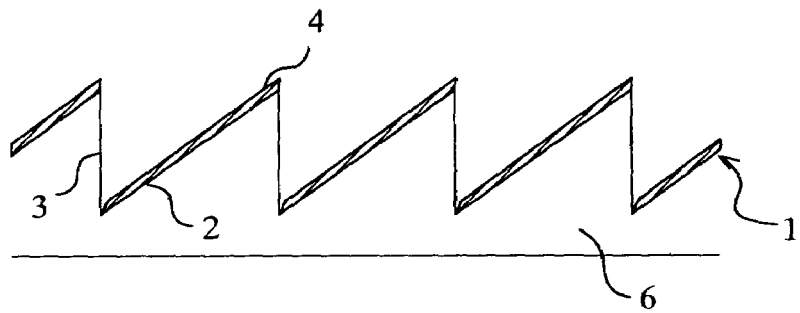
FIGS. 2A through 2D are sectional views graphically showing the method for manufacturing a shade of the diffractive optical element according to the present invention in order from FIGS. 2A through 2D.
Figure 2B:
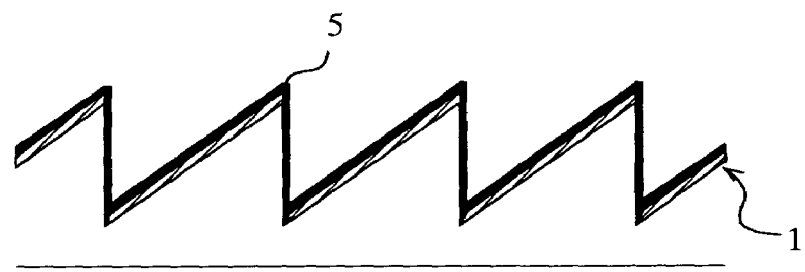
Figure 2C:
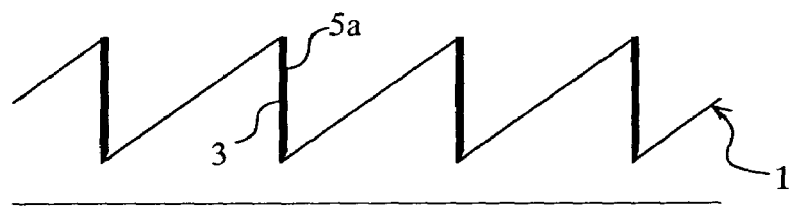
Figure 2D:
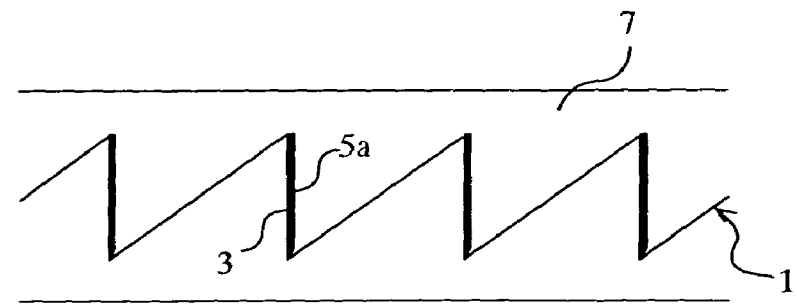
Figure 3A:
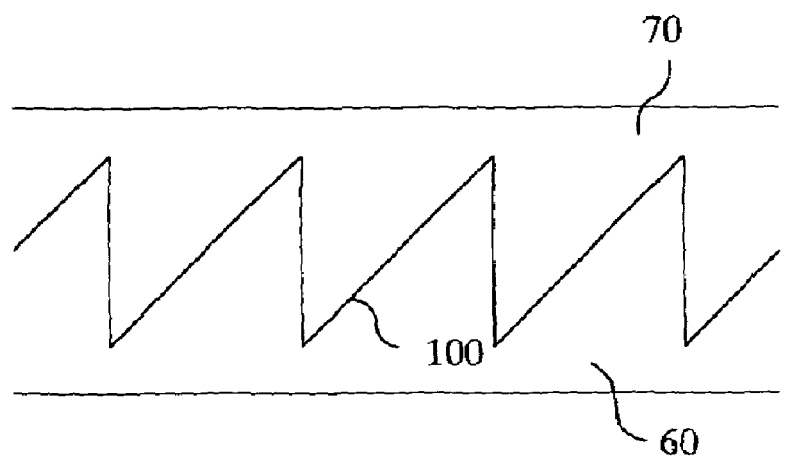
FIG. 3A is a sectional view showing a laminated multi-layer type diffractive optical element according to a prior art.
Figure 3B:
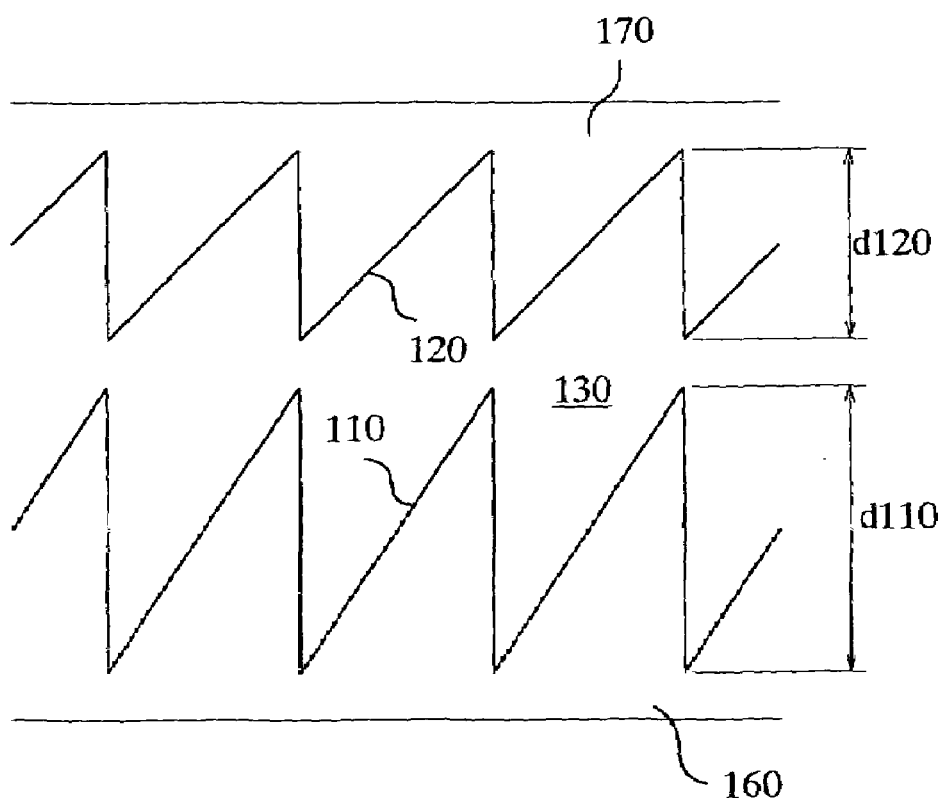
FIG. 3B is a sectional view showing a separated multi-layer type diffractive optical element according to a prior art.

A method for forming a shade film will now be explained with reference to FIG. 2. FIGS. 2A through 2D are sectional views graphically showing the processes for manufacturing a shade film 5a on the wall surface 3 of a laminated multi-layer type diffractive optical element according to the present invention in order from FIGS. 2A through 2D. At first, a parting film 4 such as tungsten oxide (WO$_3$) is formed on the slope portion 2 of the groove of the diffraction grating 1 of the first diffractive element 6. In this case, film-forming condition is set such that the parting film 4 is not formed on the wall surface 3 of the groove of the diffraction grating 1, but formed only on the slope portion 2 (FIG. 2A). Then, black paint 5 is applied on the whole surface of the groove of the diffraction grating 1 (FIG. 2B). Then, by means of dissolving the parting film 4 with an alkaline agent or the like, the black paint 5 formed on the slope portion 2 of the groove of the diffraction grating 1 is removed with the parting film 4, so that the black paint 5 remains only on the wall surface 3 of the groove of the diffraction grating 1 to form a shade film 5a (FIG. 2C). Finally, by combining the second diffractive element 7, the laminated multi-layer type diffractive optical element having a shade film 5a on the wall surface 3 of the groove of the diffraction grating 1 is completed (FIG. 2D).

As another example, the shade film 5a can be formed by painting the black paint 5 only on the wall surface 3 of the groove of the diffraction grating 1 by using a brush or the like. Moreover, in the separated multi-layer type diffractive optical element, a shade film can be formed by using the same method.

Figure 4A:
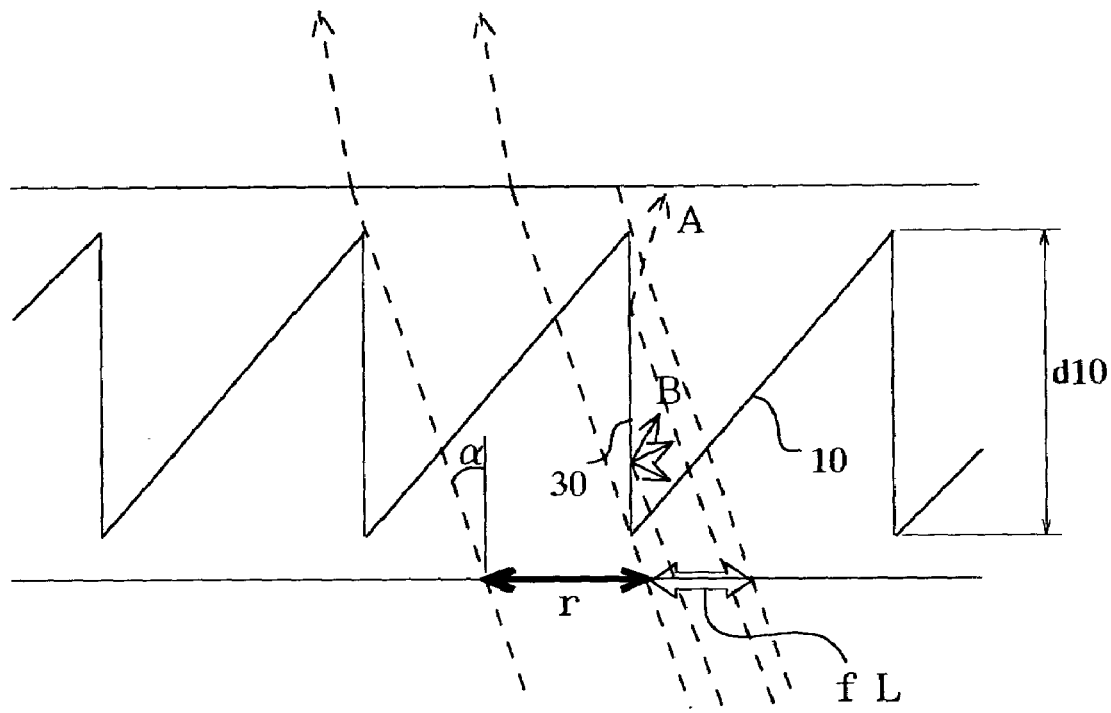
FIG. 4A is a sectional view showing a designated optical path passing through a diffraction grating of a multi-layer type diffractive optical element.
Figure 4B:
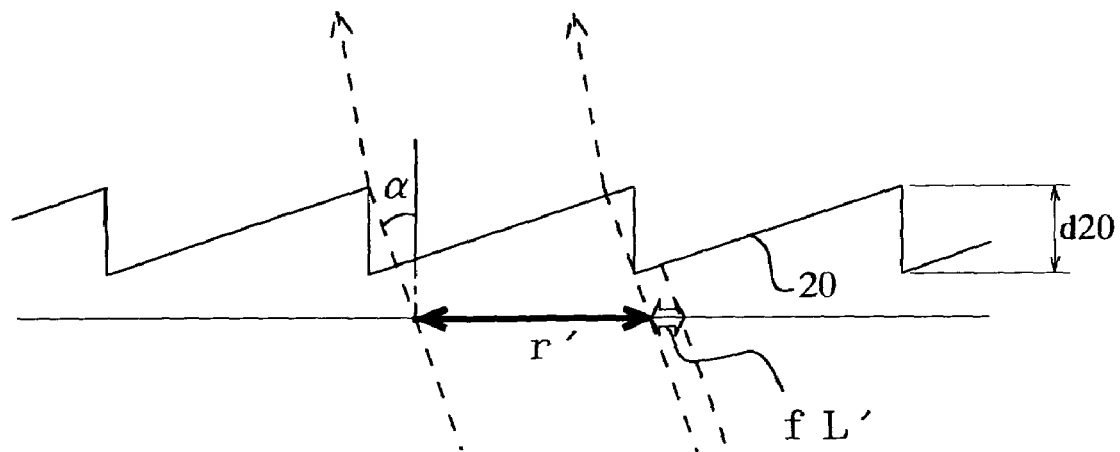
FIG. 4B is a sectional view showing a designated optical path passing through a diffraction grating of a single-layer type diffractive optical element.

In the multi-layer type diffractive optical element formed by using the above-described method, it is preferable that the pitch p of the grooves of the diffraction gratings 1, 11, and 12 is 50 µm or more, which is relatively wide. With arranging in this manner, the area where a light can proceed to a designated optical path in the diffraction grating (for example, an area r in FIG. 4A) becomes wider even if the height of the wall 3, 31, or 32 is high, so the diffraction efficiency (angular characteristic) in relation to the angle of incidence of the incident light can be improved. Moreover, when the pitch p is set to 80 µm or more, better optical performance can be expected.

Furthermore, in the present invention, it is preferable that the height h of the wall 3 of the groove of the diffraction grating 1 is set to 20 µm or less when a laminated multi-layer type diffractive optical element as shown in FIG. 1A is adopted. When the height h of the wall 3 of the groove of the diffraction grating 1 becomes higher than 20 µm, the above-described angular characteristic becomes worse. When the height h of the wall 3 of the groove of the diffraction grating 1 becomes higher than 20 µm, the angular characteristic becomes better when the separated multi-layer type diffractive optical element is adopted than when the laminated multi-layer type diffractive optical element as shown in FIG. 1B is adopted. Moreover, when the laminated multi-layer type diffractive optical element is adopted, by setting the height h of the wall 3 of the groove of the diffraction grating 1 to 18 µm or less, better optical performance can be expected.

Furthermore, in the present invention, when a laminated multi-layer type diffractive optical element is adopted, it is preferable that the materials for the individual diffractive elements are glass for glass molding and ultraviolet curing resin, respectively. Since these materials can be molded, mass productivity increases accordingly. Similarly, in the case of the separated multi-layer type diffractive optical element, it is preferable that both diffractive elements 16 and 17 are made of resin. With this construction, mass productivity increases.

In a laminated multi-layer type diffractive optical element according to the present invention, the following four conditional expressions (1) through (4) are shown for obtaining better optical performance. Among the two diffractive elements 6 and 7, when refractive index at d-line and Abbe number of the material of one diffractive element are denoted by ndG and υdG, respectively, the following conditional expressions (1) and (2) are preferably satisfied, and when refractive index at d-line and Abbe number of the material of the other diffractive element are denoted by ndR and υdR, respectively, the following conditional expressions (3) and (4) are preferably satisfied:

$$1.55 \leq ndG \leq 1.70 \tag{1}$$

$$50 \leq \upsilon dG \leq 65 \tag{2}$$

$$1.50 \leq ndR \leq 1.65 \tag{3}$$

$$\upsilon dR \leq 45 \tag{4}$$

In the above-described conditional expressions, conditional expressions (1) and (3) are for obtaining better angular characteristic. When ndG falls below the lower limit of conditional expression (1) or when ndR exceeds the upper limit of conditional expression (3), the height h of the wall 3 of the groove of the diffraction grating becomes too high, so that the angular characteristic becomes worse. On the other hand, when ndG exceeds the upper limit of conditional expression (1) or when ndR falls below the lower limit of conditional expression (3), the shape of a laminated multi-layer type diffractive optical element in which mutually different materials contact at the same diffraction grating 1 cannot be obtained.

Conditional expressions (2) and (4) are for obtaining satisfactory diffraction efficiency over the entire wavelength range. When each value comes off each range, it is not possible to obtain satisfactory diffraction efficiency over the entire wavelength range.

Moreover, when at least one limitation of the following limitations such as setting the lower limit of conditional expression (1) to 1.57, setting the upper limit of conditional expression (1) to 1.68, setting the lower limit of conditional expression (2) to 52, and setting the upper limit of conditional expression (2) to 63 is carried out, better optical performance can be obtained. Furthermore, when at least one limitation of the following limitations such as setting the lower limit of conditional expression (3) to 1.52, setting the upper limit of conditional expression (3) to 1.63, setting the lower limit of conditional expression (4) to 20, and setting the upper limit of conditional expression (4) to 43 is carried out, the better optical performance can be obtained.

Several examples are explained below. Examples 1 and 2 are the case of a laminated multi-layer type diffractive optical element as shown in FIG. 1A. Examples 3 and 4 are the case of a separated multi-layer type diffractive optical element as shown in FIG. 1B.

EXAMPLE 1

This example is the case of a laminated multi-layer type diffractive optical element as shown in FIG. 1A. In this example, a glass for glass molding, specifically, VC78 having ndG=1.66910, υdG=55.4 (a product of Sumita Optical Glass, Inc.), is used as a material of the first diffractive element 6. An ultraviolet-curing resin, specifically, HV16 having ndR=1.5980, υdR=28.0 (a product of ADEL CO., LTD) is used as a material of the second diffractive element 7. The height h of the groove of the diffraction grating 1 is 8.0 µm. In this construction, we have suppressed increase in production of flare with increasing angle of incidence and have obtained high diffraction efficiency over a wide wavelength range from g-line to C-line.

EXAMPLE 2

This example is the case of a laminated multi-layer type diffractive optical element as shown in FIG. 1A. In this example, a glass for glass molding, specifically, P-SK50 having ndG=1.59380, υdG=61.4 (a product of Sumita Optical Glass, Inc.), is used as a material of the first diffractive element 6 and an ultraviolet-curing resin A having ndR=1.5499, υdR=41.6 is used as a material of the second diffractive element 7. The height h of the groove of the diffraction grating 1 is 12.7 µm. In this construction, we have suppressed increase in production of flare in with increasing angle of incidence and have obtained high diffraction efficiency over a wide wavelength range from g-line to C-line.

EXAMPLE 3

This example is the case of a separated multi-layer type diffractive optical element as shown in FIG. 1B. In this example, an ultraviolet-curing resin B having nd=1.635, υd=22.8 is used as a material of the first diffractive element 16 and an ultraviolet-curing resin C having nd=1.524, υd=50.8 is used as a material of the second diffractive element 17. The height d11 of the groove of the diffraction grating 11 is 7.90 µm and the height d12 of the groove of the diffraction grating 12 is 10.71 µm. In this construction, we have suppressed increase in production of flare with increasing angle of incidence and have obtained high diffraction efficiency over a wide wavelength range from g-line to C-line. Incidentally, nd and υd denote refractive index at d-line and Abbe number of each diffractive element, respectively. The same definition is applied to Example 4.

EXAMPLE 4

This example is the case of a separated multi-layer type diffractive optical element as shown in FIG. 1B. In this example, a PC (polycarbonate) having nd=1.5831, υd=30.2 is used as a material of the first diffractive element 16 and a PMMA (polymethyl methacrylate) having nd=1.4917, υd=57.4 is used as a material of the second diffractive element 17. The height d11 of the groove of the diffraction grating 11 is 3.34 µm and the height d12 of the groove of the diffraction grating 12 is 15.16 µm. In this construction, we have suppressed increase in production of flare with increasing angle of incidence and have obtained high diffraction efficiency over a wide wavelength range from g-line to C-line.

As described above, the present invention makes it possible to provide a multi-layer type diffractive optical element capable of suppressing production of flares improving optical performance by forming a shade film on the wall surface of the groove of the diffraction grating.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A diffractive optical element comprising:
a first diffractive element,
a second diffractive element that is made of a material different from the first diffractive element and is cemented with the first diffractive element, and
a diffraction grating formed at cemented surfaces of the first and second diffractive elements,
wherein a shade is formed on a wall surface in each groove of the diffraction grating.

2. The diffractive optical element according to claim 1, wherein a material of the first diffractive element is a glass for glass molding, and a material of the second diffractive element is resin.

3. The diffractive optical element according to claim 2, wherein the first diffractive element satisfies the following two conditional equations:

$$1.55 \leq ndG \leq 1.70$$

$$50 \leq \upsilon dG \leq 65$$

where ndG denotes a refractive index of the first diffractive element at d-line, and υdG denotes an Abbe number of the first diffractive element at d-line; and
wherein the second diffractive element satisfies the following two conditional equations:

$$1.50 \leq ndR \leq 1.65$$

$$\upsilon dR \leq 45$$

where ndR denotes a refractive index of the second diffractive element at d-line, and υdR denotes an Abbe number of the second diffractive element at d-line.

4. The diffractive optical element according to claim 3, wherein minimum pitch of the diffraction grating grooves is 50 µm or more.

5. The diffractive optical element according to claim 4, wherein wall height of the diffraction grating grooves is 20 µm or less.

6. The diffractive optical element according to claim 3, wherein wall height of the diffraction grating grooves is 20 µm or less.

7. The diffractive optical element according to claim 2, wherein minimum pitch of the diffraction grating grooves is 50 µm or more.

8. The diffractive optical element according to claim 7, wherein wall height of the diffraction grating grooves is 20 µm or less.

9. The diffractive optical element according to claim 2, wherein wall height of the diffraction grating grooves is 20 µm or less.

10. The diffractive optical element according to claim 1, wherein the first diffractive element satisfies the following two conditional equations:

$$1.55 \leq ndG \leq 1.70$$

$$50 \leq \upsilon dG \leq 65$$

where ndG denotes a refractive index of the first diffractive element at d-line, and υdG denotes an Abbe number of the first diffractive element at d-line; and
wherein the second diffractive element satisfies the following two conditional equations:

$$1.50 \leq ndR \leq 1.65$$

$$\upsilon dR \leq 45$$

where ndR denotes a refractive index of the second diffractive element at d-line, and υdR denotes an Abbe number of the second diffractive element at d-line.

11. The diffractive optical element according to claim 10, wherein minimum pitch of the diffraction grating grooves is 50 μm or more.

12. The diffractive optical element according to claim 11, wherein wall height of the diffraction grating grooves is 20 μm or less.

13. The diffractive optical element according to claim 10, wherein wall height of the diffraction grating grooves is 20 μm or less.

14. The diffractive optical element according to claim 1, wherein minimum pitch of the diffraction grating grooves is 50 μm or more.

15. The diffractive optical element according to claim 14, wherein wall height of the diffraction grating grooves is 20 μm or less.

16. The diffractive optical element according to claim 1, wherein wall height of the diffraction grating grooves is 20 μm or less.

* * * * *